Patented June 4, 1935

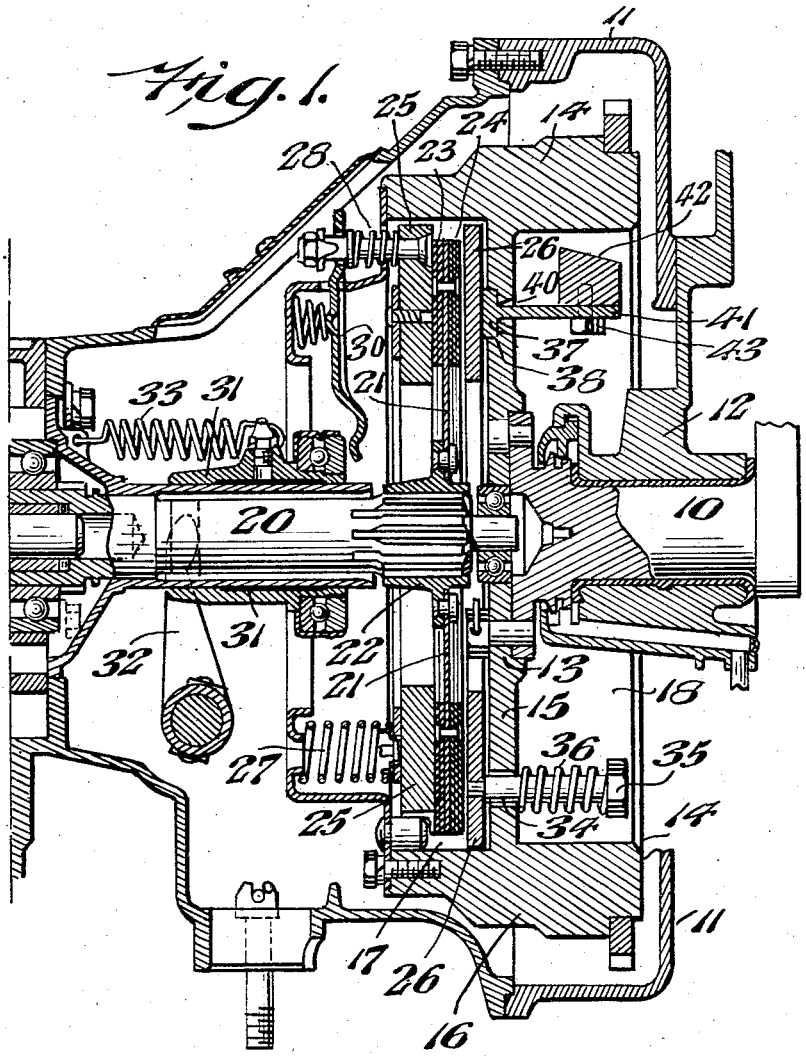

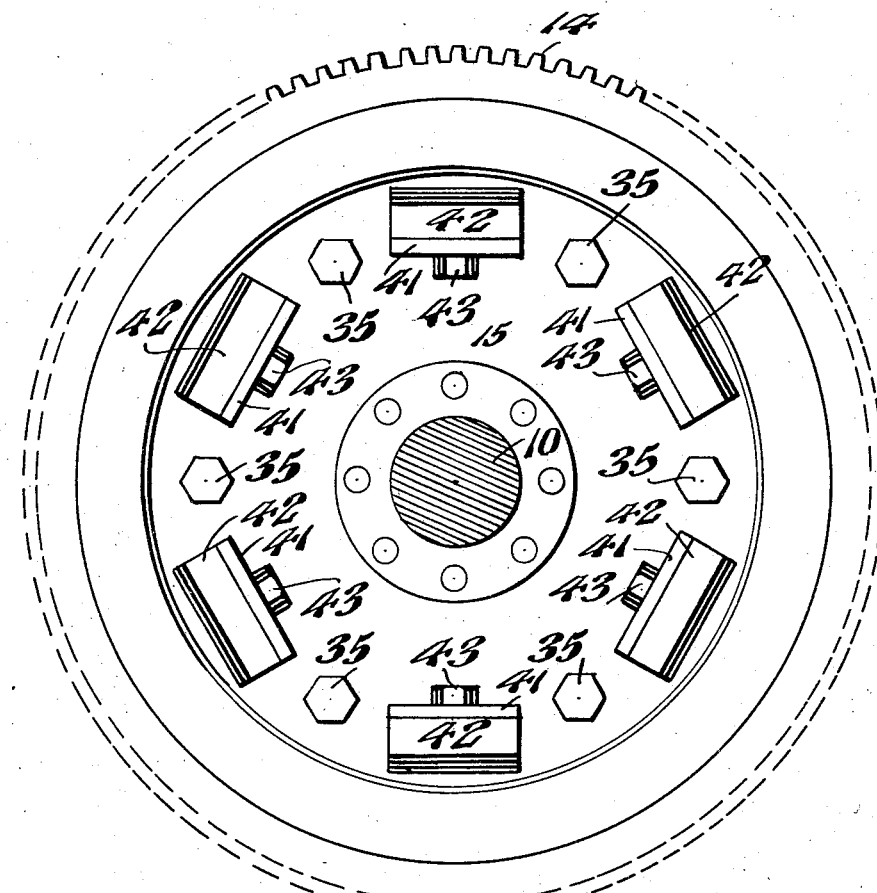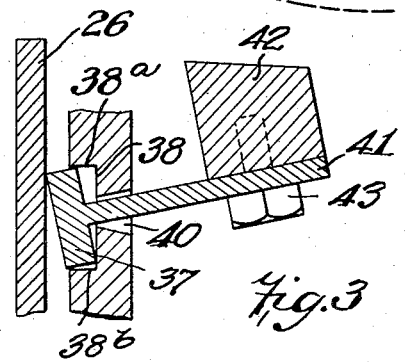

2,003,324

UNITED STATES PATENT OFFICE 2,003,324

AUTOMATIC CLUTCH DEVICE

Henry H. Vail, Camden, N. J., assignor to Automatic Drive and Transmission Company, Gloucester City, N. J., a corporation of New Jersey Application October 15, 1930, Serial No. 488,757

7 Claims. (Cl. 192—105)

The present invention relates to power transmitting means and more particularly to automatically controlled clutches for connecting power driving shafts and associated parts with driven parts of a driven shaft.

In clutches of the automatic type it has heretofore been proposed to utilize weights operated by centrifugal force for controlling the transfer of power from a driving element to a driven element but in the practical application of such devices it has only been done by constructing either a complete mechanically involved unit or a complete control mechanism as a replacement unit. In the one instance the unit is assembled complete and built into an automobile, for example, between the driving shaft and the driven shaft without regard to any ordinary manually controlled clutch assembly. In the other instance the unit is designed as a replacement for a manually controlled clutch assembly, thereby necessitating the tearing down and removal of the fly wheel, the clutch and its control and substituting therefor the centrifugally operated parts, a clutch mechanism and fly wheel. In both instances the expense of construction and installation of such automatic clutch devices is prohibitive and stands in the way of general adoption and use.

Some of the objects of the present invention are to provide an automatic clutch control which can be attached to an ordinary fly wheel and manual clutch while leaving the latter intact and its general assembly undisturbed; to provide a centrifugal control for clutches which can be quickly and readily assembled as a part of an ordinary fly wheel construction; to provide a simple and efficient clutch mechanism under the control of the speed of rotation of the parts; to provide means whereby manual declutching of the parts can take place without overcoming the pressure of the centrifugally controlled parts; and to provide other improvements as will hereinafter appear.

In the accompanying drawings Fig. 1 represents a sectional elevation of a clutch and fly wheel assembly embodying one form of the present invention; Fig. 2 represents an end elevation of the fly wheel, portions of the casing and associated parts being removed or broken away to expose the parts illustrated, and Figure 3 is a fragmental sectional view on an enlarged scale, of the centrifugally operable lever assembly illustrated in Figure 1, but shows the lever rocked outwardly from the position shown in that figure.

Referring to the drawings one form of the present invention is shown by way of example as applied to an automotive clutch and fly wheel assembly wherein the driving shaft 10 enters the housing 11 by way of the bearing 12 and is made fast to the hub 13 of the fly wheel 14. The fly wheel 14 is of the web type having a substantially centrally disposed web 15 interconnecting the hub 13 with the rim 16 so that annular spaces 17 and 18 are formed at opposite sides of the web 15. In the ordinary construction the space 17 is utilized to receive the clutch parts while the space 18 is empty. In the construction of the present invention the space 17 still contains the clutch parts but the space 18 is used for certain adjuncts of the automatic control.

For transmitting power from the fly wheel 14 to the driven shaft 20 a single clutch plate 21 is attached to a hub 22 which is internally fluted for complemental mounting upon the fluted end of the driven shaft 20. This construction transmits rotary movement of the hub 22 to the shaft 20 while permitting axial relative movement to the hub 22. The outer circumferential portion of the plate 21 is provided at opposite sides respectively with friction rings 23 and 24 for engagement respectively with the two oppositely acting clutch members 25 and 26, the former, in the present instance, serving as the backing clutch member to resist the pressure applied by the movable clutch member 26. The clutch member 25 is the regular manually controllable plate and in the construction illustrated is manually held pressed toward the clutch plate 21 by a number of coil springs 27 while provision is made for moving the member 25 counter to the action of the springs 27 and to declutched position by means of spring tension adjustable studs 28 which are arranged to be engaged respectively by declutching levers 30 having free ends located in the path of movement of a slidable sleeve 31 under control of the manually operable lever 32. This sleeve 31 is automatically withdrawn by means of a stretched coil spring 33 so that when the manual pressure is relieved the clutch member 25 returns to clutching position.

In order to operate the clutch automatically the side of the web 15 which, in the usual construction, serves as a backing plate for the clutch plate 21 is cut away and replaced by the movable clutch member or clutch ring 26 and this ring seats against the side of the web and has a width such that a clearance normally exists between the friction plate 24 and the member 26. This clearance is maintained by the provision of a plurality of pins 34 anchored at one end to the member 26 and projecting through the web 15 parallel to the axis of rotation into the space 18 where each pin terminates in a head 35 forming respectively abutments for coil springs 36 encircling the respective pins 34. In view of the fact that pins 34 are provided with shoulders of considerable area engaging plate 26, it is apparent that they are thereby reenforced against bodily outward movement or distortion under the influence of centrifugal force acting upon their unsupported ends. While in the present construction the hold-back bolts or pins 34 perform the function of causing plate 26 to rotate with flywheel 14, and the further function of urging plate 26 toward the flywheel web, it is to be understood that if desired separate keying means of conventional form, may be used for plate 26. Thus the springs 36 acting against one face of the web 15 tend to project the pins outwardly, or to the right as seen in Fig. 1, to hold the clutch member 26 out of engagement with the parts of the clutch plate 21. This clearance is not closed by any follow-up movement of the clutch member 25 under the action of the springs 27 because the studs 28 are set to limit the travel of the clutch member 25 toward clutching position. The clutch member 26 is shifted to clutching engagement with the plate 21 through the action of a plurality of short lever arms 37 seated respectively in recesses 38 spaced about the clutch side face of the web 15 at suitable intervals and at the same radial distance from the axis of rotation. These recesses 38 are each provided with outer and inner walls 38a and 38b respectively, which constitute abutments and cooperate with the short arms or radially directed portions 37 of the centrifugal levers in a manner to prevent them from twisting or moving bodily outwardly or inwardly as they rock outwardly and inwardly during operation. Recesses 38 open respectively into holes 40 passing through the web 15 and which serve to permit the passage of the long arms 41 of the aforesaid levers and it will here be noted that there is sufficient clearance between the walls of the holes 40 and the arms 41 so that the latter are free to have a limited rocking motion therein. These long arms 41 extend into the space 18 and each carries on its free end a weight 42 which is rigidly made fast thereto by a bolt 43 or like fastening means. The construction just described is such that when the fly wheel 14 is stationary the short lever arms 37 will rest in the recesses 38 so that the outer working faces thereof are parallel to and in contact with the juxtaposed face of the clutch member 26, but any movement of the long arm levers 41 outwardly with respect to the axis of rotation will cause one end of each short lever arm 37 to fulcrum in its seat so that the other end of each of these lever arms will be forced outwardly or away from the web 15 to thereby shift the clutch member 26 away from the web and into frictional engagement with the clutch plate friction ring 24. This action brings about operation of the clutch parts and transmits movement from the fly wheel to the driven shaft 20. It will thus be evident that the operation of the clutch is directly under the control of the weights 42 acting upon the control levers and that the speed of rotation bears a direct relation to the amount of the applied pressure on the clutch member 26. It should be particularly noted that the outer edges of short lever arms 37 bear upon plate 26 approximately centrally of the face thereof and in line contact therewith, whereby pressure exerted upon plate 26 by the weight assemblies is uniformly distributed over the entire area of plate 26 and any warping or distorting tendencies thereof under pressure are clearly avoided.

From the foregoing it will be apparent that an extremely simple mechanism has been devised for transforming ordinary manually controlled clutches into automatic clutches operable by the speed of rotation of the driving member and that such mechanism is particularly free of mechanical complications in that it consists of few parts each of which is applicable to present day fly wheel and clutch construction. In installing the device of the present invention it is unnecessary to eliminate and dispense with the ordinary clutch parts as all of these are now retainable in their interrelated assembly and the only change necessary in the installation of the present invention is to face off a portion of the fly wheel web, provide apertures for the operating levers, connect the weights and install the spring actuated pins which are connected to the clutch member which has been substituted for the removed metal of the fly wheel web.

Having thus described my invention, I claim:

1. A clutch mechanism comprising a fly-wheel provided with a web; a pair of clutch plates carried by said fly-wheel; a clutch member disposed between said plates; a driven member non-rotatively secured to said clutch member; means to resiliently urge both of said plates and said member toward said web; manually operable means to withdraw one of said plates against the action of said resilient means; and centrifugally operated mechanism comprising a plurality of weight levers extending through and fulcrumed in recesses in said web to force the other of said plates and said member against said first plate and said resilient means.

2. In an automatic clutch mechanism, a disclike driving member; a driven member; said members having cooperating frictional surfaces; means mounting said members for engagement and disengagement; a reaction member, a plurality of lever elements having a width approximately equal to the width of said frictional surfaces adapted to act throughout their width in line contact with, and apply forces to surface portions of said driving member, substantially centrally of the area of said frictional surfaces and which are adapted to force said members into frictional engagement when said driving member attains a predetermined speed, said elements being disposed and operating at a radial distance from the axis of the mechanism which is less than the radial distance of the periphery of said frictional surfaces and being disposed wholly to one side of said driving member; said lever elements having portions reacting in line contact with surface portions of said reaction member.

3. The mechanism set forth in claim 2, wherein each of said elements is provided with a body portion disposed substantially parallel to the axis of the mechanism, and wherein the portions of said elements which engage said driving member are disposed radially outwardly of the body portions of said elements.

4. In an automatic clutch, a friction driving member and a reaction member mounted for synchronous rotation and adapted to undergo relative axial movement, said members having neighboring surface portions disposed substantially normal to their axis of rotation, said reaction member having a plurality of chordally disposed slots provided therein; a centrifugally operable lever extending through each of said slots and operable to rock outwardly in a plane parallel to the axis of rotation and force said members apart when they attain a predetermined speed; each of said levers having a radially directed portion disposed between said members and providing plane surfaces which are adapted to engage the neighboring surface portions of said members when said levers are disposed in inoperative position; and a plurality of abutments provided on one of said members and operable to engage the radially outward surfaces of said radially directed portions of said levers for restraining the latter against outward bodily movement when they rock in response to centrifugal force.

5. The clutch described in claim 4, wherein the end walls of said slots are operable to restrain said levers against chordal displacement.

6. The clutch described in claim 4, wherein said abutments are provided on and constitute an integral part of said reaction member.

7. The clutch described in claim 4, wherein the radially directed portions of said levers extend both radially inwardly and outwardly of the portions of said levers which extend through said apertures.

HENRY H. VAIL.